United States Patent Office 3,281,402
Patented Oct. 25, 1966

3,281,402
PROCESS FOR PRODUCTION OF RUBBERY
CIS-1,4-POLYBUTADIENE
Robert P. Zelinski, Bartlesville, Okla., assignor to Phillips Petroleum Company, a corporation of Delaware
No Drawing. Filed Nov. 26, 1962, Ser. No. 240,124
16 Claims. (Cl. 260—94.3)

This invention relates to a process for polymerizing 1,3-butadiene so as to obtain a rubbery polymer. In one aspect, the invention relates to the process for producing cis 1,4-polybutadiene and a novel catalyst system therefor.

There has been a great deal of activity in recent years in the development of processes for producing olefin polymer. Polymers of monoolefins, such as ethylene and propylene, prepared by these processes have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber. The present invention is concerned with a novel and improved process for preparing a polybutadiene containing a high percentage of cis 1,4-addition.

It is an object of this invention to provide a process for producing a rubbery polymer of 1,3-butadiene.

Another object of the invention is to provide a process for polymerizing 1,3-butadiene in which the rubbery polymer produced contains a high percentage, e.g., from 85 to 98 percent and higher, of cis 1,4-addition.

A further object of the invention is to provide a novel catalyst system for use in the preparation of a polybutadiene of high cis 1,4-content.

Other and further objects and advantages of the invention will become apparent to those skilled in the art upon consideration of the accompanying disclosure.

Broadly speaking, the process of this invention comprises the step of contacting 1,3-butadiene with a catalyst formed by mixing materials comprising (a) an organometal compound having the formula $R_nM$ or $R_2AlH$, wherein R is an alkyl, cycloalkyl, aryl, or combination of these radicals, such as alkaryl, aralkyl, cycloalkylalkyl or cycloalkylaryl, each R preferably containing from 1 to 20, inclusive, carbon atoms, M is magnesium or aluminum, and $n$ is an integer equal to the valence of the metal M, and (b) the hydrocarbon-soluble reaction product of sodium iodide and a titanium halide having the formula $TiX_y$, wherein X is chlorine or bromine and $y$ is an integer from 2 to 4, inclusive. It has been found that when the above-described catalyst is used in the polymerization of 1,3-butadiene, a polybutadiene is produced which contains from 85 to 98 percent and higher of cis 1,4-addition.

In preparing the high cis-polybutadiene product of this invention, certain procedures are preferably followed when forming the catalyst compositions. The sodium iodide and the titanium chloride or bromide are first contacted with one another and allowed to react in the absence of a solvent or diluent at a temperature generally in the range of 60 to 300° F., preferably at a temperature in the range of 120 to 250° F. The time required for the reaction depends upon the temperature used and is usually in the range of 30 minutes to 50 hours. Ordinarily, the contact time is in the range of 1 to 25 hours. During the reaction of the sodium iodide with the titanium halide, the materials are generally stirred or subjected to some form of agitation. The reaction product obtained is a solid which is then treated with a hydrocarbon, such as benzene, toluene, cyclohexane, or other material which is also suitable for use as a polymerization diluent, to extract the soluble portion of the material. This can readily be accomplished by separating the insoluble material from the soluble portion by decantation, centrifugation, filtration, or the like. The hydrocarbon solution of the soluble sodium iodide-titanium halide reaction product is then ready for use as a component in the catalyst system. It was completely unexpected when it was found that a catalyst effective for preparing a high cis-polybutadiene could be formed by mixing the reaction product with certain organometal compounds. The unobvious nature of the present catalyst system is demonstrated by the fact that if a hydrocarbon diluent is present when the sodium iodide and titanium halide are reacted, the resulting material is not active as a catalyst component. Furthermore, if sodium iodide is charged directly to a polymerization system in which the other components are an organometal compound and a titanium halide, the mixture obtained does not catalyze the polymerization of 1,3-butadiene to a cis-polybutadiene.

While it is preferred to prepare the sodium iodide-titanium halide reaction product in the absence of a diluent as described above, it has been found that a diluent can be used if a promoter is also present. Thus, in one embodiment of the invention, sodium iodide and a titanium halide are reacted in a hydrocarbon diluent in the presence of aluminum chloride, and the resulting solution is used as a catalyst component along with the organometal compound in forming the present catalyst system.

Examples of organometal compounds suitable for use in forming the present catalyst system include dimethylmagnesium,
diethylmagnesium,
di-n-propylmagnesium,
di-tert-butylmagnesium,
di-n-hexylmagnesium,
didecylmagnesium,
di(tridecyl)magnesium,
dieicosylmagnesium,
dicyclohexylmagnesium,
di-4-methylcyclohexylmagnesium,
dibenzylmagnesium,
di(4-phenyl-n-butyl)magnesium,
diphenylmagnesium,
di-1-naphthylmagnesium,
di-4-tolylmagnesium,
di(2,4-diethylphenyl)magnesium,
di(3,5-di-n-heptylphenyl)magnesium,
methylethylmagnesium,
methylphenylmagnesium,
butylbenzylmagnesium,
triethylaluminum,
tri-n-propylaluminum,
tri-n-butylaluminum,
triisobutylaluminum,
tri-n-heptylaluminum,
tridodecylaluminum,
trieicosylaluminum,
triphenylaluminum,
tribenzylaluminum,
tri(2-phenylethyl)aluminum,
tri(6-phenylhexyl)aluminum,
tri[6(1-naphthyl)hexyl]aluminum,
tri[9(2-naphthyl)nonyl]aluminum,
tri-2-tolylaluminum,
tri(2,4-dimethylphenyl)aluminum,
tri(3-ethylphenyl)aluminum, tri(2,4-dimethyl-6-ethylphenyl)aluminum,
tri(4-n-butylphenyl)aluminum,
tri(2-n-hexylphenyl)aluminum,
tri(2,4,6-isobutylphenyl)aluminum,
tri(4-dodecylphenyl)aluminum,
tri(2-methyl-1-naphthyl)aluminum,
tri(2,4,5,7-tetraethyl-1-naphthyl)aluminum,
tri(4,5-dipentyl-2-naphthyl)aluminum,
tricyclohexylaluminum,
tricyclopentylaluminum,
methyldicyclohexylaluminum,
tri(4-pentadecylcyclopentyl)aluminum,
tri(4-ethylcyclohexyl)aluminum,
tri(2,4-diethylcyclohexyl)aluminum,
tri(3-isobutylcyclohexyl)aluminum,
tri(2,4,6-tri-n-propylcyclohexyl)aluminum,
tri(2-n-propylcyclopentyl)aluminum,
tri(2-cyclohexylethyl)aluminum,
tri(3-cyclopentylbutyl)aluminum,
tri(14-cyclohexyltetradecyl)aluminum,
dimethylaluminum hydride,
diethylaluminum hydride,
diisobutylaluminum hydride,
didecylaluminum hydride,
dieicosylaluminum hydride,
dicyclopentylaluminum hydride,
dicyclooctylaluminum hydride,
di(3-ethylphenyl)aluminum hydride,
diphenylaluminum hydride,
propylphenylaluminum hydride,
di(3-cyclohexylpropyl)aluminum hydride,
di(4-cycloheptyldecyl)aluminum hydride,
di(3-phenylbutyl)aluminum hydride,
dibenzylaluminum hydride,
di(2,4-diphenyloctyl)aluminum hydride,
di(2-methylcyclopentyl)aluminum hydride,
di(5-nonylcyclononyl)aluminum hydride,
di(2-phenylcyclopentyl)aluminum hydride,
di(2,4-diphenylcyclooctyl)aluminum hydride,
di(2-methylphenyl)aluminum hydride,
di(2,4-dibutylphenyl)aluminum hydride,
di(2,4-dioctylphenyl)aluminum hydride,
di(4-cyclobutylphenyl)aluminum hydride,
di(2,4-dicyclopentylphenyl)aluminum hydride,
di(2,4-cyclooctylphenyl)aluminum hydride, and the like.

Examples of specific catalyst systems which can be employed in the practice of this invention include the following: diethylmagnesium and the hydrocarbon-soluble reaction product of sodium iodide and titanium tetrachloride; diphenylmagnesium and the hydrocarbon-soluble reaction product of sodium iodide and titanium tetrachloride; diphenylmagnesium and the hydrocarbon-soluble reaction product of sodium iodide and titanium tetrabromide; dicyclohexylmagnesium and the hydrocarbon-soluble reaction product of sodium iodide and titanium trichloride; di-1-naphthylmagnesium and the hydrocarbon-soluble reaction product of sodium iodide and titanium tetrachloride; triisobutylaluminum and the hydrocarbon-soluble reaction product of sodium iodide and titanium tetrachloride; tri-n-hexylaluminum and the hydrocarbon-soluble reaction product of sodium iodide and titanium tetrachloride; triphenylaluminum and the hydrocarbon-soluble reaction product of sodium iodide and titanium tetrachloride; dimethylaluminum hydride and the hydrocarbon-soluble reaction product of sodium iodide and titanium tetrachloride; dipropylaluminum hydride and the hydrocarbon-soluble reaction product of sodium iodide and titanium tetrabromide; diisobutylaluminum hydride and the hydrocarbon-soluble reaction product of sodium iodide and titanium tetrachloride; diphenylaluminum hydride and the hydrocarbon-soluble reaction product of sodium iodide and titanium tetrabromide; di(3-ethylphenyl)aluminum hydride and the hydrocarbon-soluble reaction product of sodium iodide and titanium tetrachloride.

In preparing the sodium iodide-titanium halide reaction product, the amount of the sodium iodide employed is generally in the range of 1 to 5 mols per mol of the titanium halide. The amount of the organometal compound employed in the catalyst system is dependent upon the particular organometal used. When an organoaluminum compound is employed, the mol ratio of organometal to titanium halide is in the range of 2:1 to 20:1, preferably in the range of 3:1 to 8:1. When an organomagnesium compound is used, the mol ratio of organometal to titanium halide is in the range of 0.75:1 to 3:1. When aluminum chloride is used as a promoter in preparing the catalyst, the mol ratio of aluminum chloride to sodium iodide is generally in the range of 0.05:1 to 0.5:1. The concentration of total catalyst used in the present process can vary over a relatively wide range. The catalyst level is generally in the range of 1 to 20 gram millimols of the organometal compound per 100 grams of 1,3-butadiene to be polymerized. The actual catalyst level used is, in general, determined by the molecular weight of the product which is desired.

The polymerization process of this invention is usually carried out in the presence of a diluent. Diluents suitable for use in the process are hydrocarbons which are non-detrimental to the polymerization reaction. Suitable diluents include aromatics, such as benzene, toluene, the xylenes, ethylbenzene and mixtures thereof. It also is within the scope of the invention to use straight and branched chain paraffins which contain up to and including 12 carbon atoms per molecule. Examples of suitable paraffins include propane, normal butane, normal pentane, isopentane, normal hexane, isohexane, 2,2,4-triethylpentane (isooctane), normal decane, normal dodecane, and the like. Mixtures of these paraffinic hydrocarbons can also be employed as diluents in carrying out the process. Cycloparaffins, such as cyclohexane and methylcyclohexane, can also be used as diluents. It is usually preferred to carry out the polymerization in the presence of an aromatic hydrocarbon since polymers having a higher cis-content are produced when operating with this diluent.

The polymerization process of this invention can be carried out at temperatures varying over a rather wide range, e.g., from −100 to 250° F. It is usually preferred to operate at a temperature in the range of −30 to 160° F. The polymerization reaction can be carried out under autogenous pressure or any suitable pressure sufficient for maintaining the reaction mixture substantially in the liquid phase. The pressure will thus depend upon the particular diluent being employed and the temperature at which the polymerization is conducted. However, higher pressures can be utilized if desired, these pressures being obtained by some such suitable method as the pressurization of the reactor with a gas which is inert with respect to the polymerization reaction. It is to be understood also that it is within the scope of the invention to conduct the polymerization in the solid phase.

The process of this invention can be carried out as a batch process by charging 1,3-butadiene to a reactor containing the catalyst and diluent. Although any suitable charging procedure can be used, it is often preferred to add the catalyst component to a reactor containing diluent and thereafter introducing the 1,3-butadiene. As discussed hereinbefore, the hydrocarbon-soluble reaction product of sodium iodide and a titanium halide is separately prepared prior to being contacted with the organometal compound. It is to be understood that it is within the scope of the invention to preform the catalyst by reacting the catalyst components, i.e., the organometal compound and the hydrocarbon-soluble reaction product, within a separate catalyst preparation vessel. The resulting reaction mixture can then be charged to the reactor containing monomer and diluent, or these latter materials can be added after the catalyst. The process also can be carried out continuously by maintaining the above-mentioned concentrations of reactants in a reactor for a suitable residence time. The residence time in a continuous process will, of course, vary within rather wide limits, depending on such variables as temperature, pressure, the ratio of catalyst components and the catalyst concentration. In a continuous process, the residence time usually falls within the range of one second to two hours when conditions within the specified ranges are employed. When the batch process is being utilized, the time for the reaction can be as high as 24 hours or more.

Various materials are known to be detrimental to the catalyst composition of this invention. These materials include carbon dioxide, oxygen and water. It is usually desirable, therefore, that the butadiene be freed of these materials as well as other materials which tend to inactivate the catalyst. Any of the known means for removing such contaminants can be used. Furthermore, when a diluent is utilized in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

Upon completion of polymerization reaction, when a batch process is used, the total reaction mixture is then treated to inactivate the catalyst and recover the rubbery product. Any suitable method can be employed in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the polymer. It has also been found to be advantageous to add an antioxidant, such as 2,2'-methylene-bis(4-methyl-6-tert-butylphenol), to the polymer solution prior to recovery of the polymer. After addition of the catalyst-inactivating material and the antioxidant, the polymer present in the solution can then be separated by the addition of an excess of the material, such as ethyl alcohol or isopropyl alcohol. When the process is carried out continuously, the total effluent from the reactor can be pumped to a catalyst-inactivating zone wherein the reactor effluent is contacted with a suitable catalyst-inactivating material such as an alcohol. When an alcohol is used as the catalyst-inactivating material, it also functions to precipitate the polymer. In the event the catalyst-inactivating materials which are employed do not perform this dual function, a suitable material, such as an alcohol, can be added to precipitate the polymer. It is, of course, to be realized that it is within the scope of the invention to employ other suitable means to recover the polymer from the solution. After separation from the water or alcohol and diluent by filtration or other means, the polymer is then dried.

The polymers produced in accordance with this invention are rubbery polymers. The polymers can be compounded by the various methods that have been used in the past in compounding natural and synthetic rubbers. Vulcanization accelerators, vulcanizing agents, reinforcing agents and fillers such as have been employed in natural and synthetic rubbers can likewise be used in compounding the rubbers of this invention. It is also within the scope of the invention to blend the polymers with other polymeric materials, such as natural rubber, cis 1,4-polyisoprene, polyethylene and the like. As mentioned hereinbefore, the polymers of this invention have a very high cis-content, and this property renders them very suitable for applications requiring low hysteresis, high resilience and low freeze point. In general, the polymers have utility in applications where natural and synthetic rubbers are used. They are particularly useful in the manufacture of automobile and truck tires and other rubbery articles, such as gaskets.

A more comprehensive understanding of the invention can be obtained by referring to the following illustrative examples which are not intended, however, to be unduly limitative of the invention.

Samples of certain of the polymer products produced in the runs described in the examples were examined by infrared analysis. This work was carried out in order to determine the percentage of the polymer formed by cis 1,4-addition, trans 1,4-addition and 1,2-addition of the butadiene. The procedure described hereinafter was employed in making these determinations.

Polymer samples were dissolved in carbon disulfide to form a solution having 25 grams of polymer per liter of solution. The infrared spectrum of each of the solutions (per cent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

EXAMPLE I

A sodium iodide-titanium tetrachloride reaction product was prepared and used as a catalyst component along with triisobutylaluminum for the production of cis-polybutadiene. Fifteen grams (0.1 mol) of sodium iodide was dried by heating it in an atmosphere of nitrogen for two hours at 175° F. Ten grams (0.05 mol) of titanium tetrachloride was added and the mixture was heated and stirred in an atmosphere of nitrogen for three hours at 175° F. Soluble material was extracted from the solid reaction product by the addition of 85 milliliters of dry toluene. There was obtained a dark red solution which was employed in the following recipe for the polymerization of butadiene:

*Recipe*

| | |
|---|---|
| 1,3-butadiene, parts by weight | 100 |
| Toluene, parts by weight | 1000 |
| Triisobutylaluminum, mhm.[2] | 3.2 |
| NaI-TiCl$_4$ reaction product, mhm.[1] | Variable |
| Temperature, ° F. | 41 |
| Time, hours | 2 |

[1] Assume that all titanium charged was present in the solution of the NaI–TiCl$_4$ reaction product.
[2] Millimols per 100 grams of monomer.

Toluene was charged first, after which the reactor was purged with nitrogen. The butadiene and triisobutylaluminum were then added in the order named. The mixture was cooled to 41° F. and the NaI–TiCl₄ reaction product was introduced. After a two-hour polymerization period, the reaction was short-stopped with one part by weight of 2,2′-methylene-bis(4-methyl-6-tert-butylphenol) dissolved in a mixture of equal volumes of isopropyl alcohol and toluene. The polymer was then coagulated in isopropyl alcohol, separated, and dried.

The results of two runs, in which different quantities of the NaI–TiCl₄ reaction product were used, are presented below in Table I.

TABLE I

| Run No. | NaI-TiCl₄ Reaction Product, mhm.[1] | Al/Ti, Mol Ratio | Conv., percent | Inh.[2] Visc. | Gel,[3] percent | Microstructure, percent | | |
|---|---|---|---|---|---|---|---|---|
| | | | | | | cis | trans | Vinyl |
| 1 | 0.533 | 6/1 | 16.4 | 1.29 | 0 | 95.1 | 1.9 | 3.0 |
| 2 | 0.8 | 4/1 | 37.3 | 1.48 | 0 | 94.2 | 2.7 | 3.1 |

[1] Based on titanium.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

The data in Table I show that a polybutadiene containing a high percentage of cis 1,4-addition is obtained when butadiene is polymerized according to the present process.

Similar runs are conducted in which titanium trichloride and titanium tetrabromide are substituted for the titanium tetrachloride in the above-described system, and high cis-polybutadiene products are obtained. Runs are also carried out in which diisobutylaluminum hydride and diphenylmagnesium are used in place of triisobutylaluminum in the above-described system. The products produced are high cis-polybutadienes.

EXAMPLE II

A mixture of 22.5 grams (0.15 mol) of sodium iodide and 10 grams (0.05 mol) of titanium tetrachloride was heated at 122° F. for 16 hours in an atmosphere of nitrogen as in Example I. Toluene in the amount of 100 milliliters was added to the solid reaction product and the mixture filtered through glass wool to remove the solid residue. The solution was used as a catalyst component along with triisobutylaluminum for the polymerization of butadiene. The recipe and polymerization procedure were the same as in Example I. The results of three runs are shown in Table II.

A control run was carried out in which sodium iodide was added directly to the polymerization system. In this run the sodium iodide was charged as a toluene slurry to a reactor containing toluene, butadiene, and triisobutylaluminum. The titanium tetrachloride was charged last. The reactor was maintained at 41° F., and at the end of 16 hours no polymerization had occurred. A similar run was made with potassium iodide, and no polymer was obtained after 16 hours at 41° F. In still another control run, a mixture of sodium iodide and titanium tetrachloride in a 2:1 mol ratio was heated and agitated in the presence of toluene for 16 hours at 122° F. When this material was tried as a catalyst component with triisobutylaluminum for the polymerization of butadiene, no polymer was obtained.

A 1:1 mol ratio of sodium iodide and triisobutylaluminum was agitated overnight at a temperature of 122° F., and then allowed to stand for 24 hours at room temperature. The resulting slurry was employed as a catalyst component in a recipe similar to that of Example I, with 3.2 mhm. of triisobutylaluminum being charged in addition to that added with the sodium iodide. The amount of titanium tetrachloride used was 0.4 mhm. In a series of control runs using variable amounts of the sodium iodide-triisobutylaluminum slurry, no polymer was obtained after 22 hours at 41° F. When potassium iodide was used instead of sodium iodide, no polymerization occurred after a 22-hour period.

The foregoing data demonstrate that when the hydrocarbon-soluble reaction product of sodium iodide and a titanium halide was used as the catalyst component, a high cis-polybutadiene was produced. On the other hand, when sodium iodide was added directly to the polymerization system or when the reaction product of sodium iodide and triisobutylaluminum was used, no polybutadiene product was obtained.

TABLE II

| Run No. | NaI-TiCl₄ Reaction Product, mhm.[1] | Al/Ti, Mol Ratio | Conv., percent | Inh.[2] Visc. | Gel,[2] percent | Microstructure, percent | | |
|---|---|---|---|---|---|---|---|---|
| | | | | | | cis | trans | Vinyl |
| 1 | 0.4 | 8/1 | 14.3 | | | | | |
| 2 | 0.533 | 6/1 | 19.9 | 2.6 | 0 | 96.4 | 0.7 | 2.9 |
| 3 | 0.8 | 4/1 | 47.9 | 2.17 | 0 | 96.0 | 1.0 | 3.0 |

[1] Based on titanium.
[2] See appropriate footnotes to Table I.

EXAMPLE III

Two runs were carried out in which 1,3-butadiene was polymerized with a catalyst formed by mixing triisobutylaluminum and a component prepared by reacting sodium iodide and titanium tetrachloride in a hydrocarbon diluent and in the presence of aluminum chloride.

In preparing the sodium iodide-titanium tetrachloride reaction product, 1.037 grams (7.78 millimols) of anhydrous aluminum chloride was added to 100 ml. of m-xylene. Thereafter, 10.367 grams (69.2 millimols) of anhydrous sodium iodide was charged to the m-xylene containing aluminum chloride. The resulting mixture was allowed to remain at room temperature for 1.5 hours before addition of 0.285 ml. (2.59 mmols) of pure titanium tetrachloride. The resulting solution was then aged at 100° C. for 18 hours before use in the polymerization. The following recipe was employed in the polymerization.

Recipe

| | |
|---|---|
| 1,3-butadiene, parts by weight | 100 |
| Toluene, parts by weight | 1200 |
| Triisobutylaluminum, mhm. | Variable |
| NaI-TiCl$_4$ reaction product, mhm.[1] | 0.5 |
| Temperature, °F. | 41 |
| Time, hours | 19 |

[1] Based on titanium.

The procedure followed in carrying out the polymerization was similar to that described in Example I. The results obtained in the runs are shown below in Table III.

The data in the foregoing table demonstrate that a

TABLE III

| Run No. | TBA, mhm. | NaI-TiCl$_4$ Reaction Product, mhm. | Conv., percent | Inh.[1] Visc. | Gel,[1] percent | Microstructure, percent | | |
|---|---|---|---|---|---|---|---|---|
| | | | | | | cis | trans | Vinyl |
| 1 | 2.0 | 0.5 | 23 | 1.41 | 0 | 88.4 | 8.4 | 3.2 |
| 2 | 2.5 | 0.5 | 50 | 1.49 | 0 | 85.9 | 10.9 | 3.2 |

[1] See appropriate footnotes to Table I.

high cis-polybutadiene was obtained with a sodium iodide-titanium tetrachloride reaction product prepared in a hydrocarbon diluent if aluminum chloride was present as a promoter.

EXAMPLE IV

A run was carried out in which 1,3-butadiene was polymerized with a catalyst formed by mixing triisobutylaluminum and a component prepared by reacting sodium iodide and titanium tetrachloride in the absence of a hydrocarbon diluent and in the presence of aluminum chloride.

In preparing the sodium iodide-titanium tetrachloride reaction product, 1,642 grams (12.33 mmols) of anhydrous aluminum chloride was mixed with 16.50 grams (110.3 mmols) of dry sodium iodide. Thereafter, 0.452 ml. (4.11 mmols) of pure titanium tetrachloride was added, and the resulting mixture was aged for 18.5 hours at 100° C. Soluble material was extracted from the solid reaction product by the addition of 100 ml. of dry toluene. The solid material was separated from the soluble material which was then used in the polymerization. The following recipe was employed in the polymerization:

Recipe

| | |
|---|---|
| 1,3-butadiene, parts by weight | 100 |
| Toluene, parts by weight | 1000 |
| Triisobutylaluminum, mhm. | 1.5 |
| NaI-TiCl$_4$ reaction product, mhm.[1] | 0.5 |
| Temperature, °F. | 41 |
| Time, hours | 19 |

[1] Based on titanium.

The procedure followed in the run was similar to that described in Example I. The results obtained in the run are shown below in Table IV.

TABLE IV

| | |
|---|---|
| Conversion, percent | 18 |
| Inherent viscosity[1] | 2.09 |
| Gel, percent[1] | 0 |
| Microstructure, percent: | |
| cis | 91.6 |
| trans | 4.9 |
| Vinyl | 3.5 |

[1] See appropriate footnotes to Table I.

It is seen from the data in Table IV that a high cis-polybutadiene was obtained when the sodium iodide-titanium tetrachloride reaction product was prepared in the absence of a hydrocarbon diluent and in the presence of aluminum chloride. Although unnecessary for the preparation of an active catalyst component, the aluminum chloride can be tolerated when preparing the reaction product in the absence of a hydrocarbon.

EXAMPLE V

Two series of control runs were carried out in which the catalyst used in attempts to polymerize 1,3-butadiene was prepared according to the preferred procedure of the present invention except that potassium iodide was substituted for the sodium iodide.

In the first series, 100 millimols of potassium iodide and 50 millimols of titanium tetrachloride were heated for about 16 hours at 122° F. in an atmosphere of nitrogen. The resulting reaction product was extracted with 100 milliliters of toluene, and the soluble portion was recovered and used in variable amounts as a catalyst component with triisobutylaluminum. In the second series, the same quantities of potassium iodide and titanium tetrachloride were used, but the mixture was heated for 4 hours at 212° F. The resulting reaction product was extracted with 100 milliliters of toluene, and variable amounts of the soluble portion were mixed with triisobutylaluminum in forming the catalyst. The following recipe was employed in the runs:

Recipe

| | |
|---|---|
| 1,3-butadiene, parts by weight | 100 |
| Toluene, parts by weight | 1000 |
| Triisobutylaluminum, mhm. | 3.2 |
| KI-TiCl$_4$ reaction product[1] | Variable |
| Temperature, °F. | 41 |
| Time, hours | 2 |

[1] Assume that all titanium charged was present in the solution of the KI-TiCl$_4$ reaction product.

The quantities of the KI-TiCl$_4$ reaction product employed in the seven runs of each series were the same. These quantities are shown below in Table V.

TABLE V

| Run No.: | KI-TiCl$_4$ reaction product, mhm.[1] |
|---|---|
| 1 | 0.4 |
| 2 | 0.457 |
| 3 | 0.533 |
| 4 | 0.64 |
| 5 | 0.80 |
| 6 | 1.07 |
| 7 | 1.60 |

[1] Based on titanium.

No conversion of 1,3-butadiene to polymer was obtained in any of the runs. These data show that potassium iodide cannot be used as a substitute for sodium iodide in preparing the catalyst system of this invention.

As will be evident to those skilled in the art, many variations and modifications of this invention can be practiced in view of the foregoing disclosure. Such variations and modifications are believed to come within the spirit and scope of the invention.

I claim:

1. A process for polymerizing 1,3-butadiene, to produce a polymer having a high percentage of cis 1,4-addition which comprises contacting 1,3-butadiene under polymerization conditions with a catalyst formed by mixing materials comprising (a) an organometal compound selected from the group consisting of compounds having the formula $R_nM$ and compounds having the formula $R_2AlH$, wherein R is selected from the group consisting of alkyl, cycloalkyl, aryl, and combinations of these radicals, M is selected from the group consisting of magnesium and aluminum, and $n$ is an integer equal to the valence of the metal M, and (b) the hydrocarbon-soluble reaction product of sodium iodide and a titanium halide having the formula $TiX_y$, wherein X is selected from the group consisting of chlorine and bromine, and $y$ is an integer from 2 to 4, inclusive, said reaction product having been formed by contacting sodium iodide and titanium halide with up to 0.5 mol of aluminum chloride per mol of sodium iodide and in the absence of the hydrocarbon diluent when no aluminum chloride is present, there being at least 0.05 mol of aluminum chloride per mol on sodium iodide when hydrocarbon diluent is present, and dissolving soluble portion of the total reaction product in hydrocarbon diluent selected from the group consisting of paraffins, cycloparaffins, aromatics and mixtures thereof having 3 to 12 carbon atoms per molecule, the mol ratio of said organometal compound to said titanium halide being in the range of 2:1 to 20:1 when said organometal compound is an organoaluminum compound and in the range of 0.75:1 to 3:1 when said organometal compound is an organomagnesium compound and the mol ratio of said sodium iodide to said titanium halide being in the range of 1:1 to 5:1, said hydrocarbon soluble reaction product being separated from any hydrocarbon insoluble reaction product prior to said mixing.

2. A process according to claim 1 in which said catalyst is formed by mixing materials consisting essentially of triisobutylaluminum and the hydrocarbon-soluble reaction product of sodium iodide and titanium tetrachloride.

3. A process according to claim 1 in which said catalyst is formed by mixing materials consisting essentially of diethylmagnesium and the hydrocarbon-soluble reaction product of sodium iodide and titanium trichloride.

4. A process according to claim 1 in which said catalyst is formed by mixing materials consisting essentially of diphenylmagnesium and the hydrocarbon-soluble reaction product of sodium iodide and titanium tetrabromide.

5. A process according to claim 1 in which said catalyst is formed by mixing materials consisting essentially of triethylaluminum and the hydrocarbon-soluble reaction product of sodium iodide and titanium tribromide.

6. The process according to claim 1 in which said catalyst is formed by mixing materials consisting essentially of diisobutylaluminum hydride and the hydrocarbon-soluble reaction product of sodium iodide and titanium tetrachloride.

7. A process for polymerizing 1,3-butadiene which comprises contacting 1,3-butadiene with a catalyst formed by mixing materials comprising (a) an organometal compound selected from the group consisting of compounds having the formula $R_nM$ and compounds having the formula $R_2AlH$, wherein R is selected from the group consisting of alkyl, cycloalkyl, aryl, and combinations of these radicals, M is selected from the group consisting of magnesium and aluminum, and $n$ is an integer equal to the valence of the metal M, and (b) the hydrocarbon-soluble reaction product of sodium iodide and a titanium halide having the formula $TiX_y$, wherein X is selected from the group consisting of chlorine and bromine, and $y$ is an integer from 2 to 4, inclusive, said reaction product having been formed by contacting sodium iodide and titanium halide with up to 0.5 mol of aluminum chloride per mol of sodium iodide and in the absence of a hydrocarbon diluent when no aluminum chloride is present, there being at least 0.05 mol of aluminum chloride per mol of sodium iodide when hydrocarbon diluent is present, and dissolving the soluble portion of the total reaction product in hydrocarbon diluent selected from the group consisting of paraffins, cycloparaffins, aromatics and mixtures thereof having 3 to 12 carbon atoms per molecule, the mol ratio of said organometal compound to said titanium halide being in the range of 2:1 to 20:1 when said organometal compound is an organoaluminum compound and in the range of 0.75:1 to 3:1 when said organometal compound is an organomagnesium compound and the mol ratio of said sodium iodide to said titanium halide being in the range of 1:1 to 5:1, said hydrocarbon soluble reaction product being separated from any hydrocarbon insoluble reaction product prior to said mixing, said contacting of 1,3-butadiene occurring in the presence of a hydrocarbon diluent at a temperature in the range of $-100$ to $250°$ F. and under autogenous pressure; and recovering a polymer of butadiene containing a high percentage of cis 1,4-addition.

8. A process according to claim 7 in which the mol ratio of said organometal compound to said titanium halide is in the range of 3:1 to 8:1 and said organometal compound is an organoaluminum compound.

9. A process according to claim 7 in which said component (b) is prepared by contacting said sodium iodide and said titanium in the absence of hydrocarbon diluent at a temperature in the range of 60 to $300°$ F. for a period in the range of 30 minutes to 50 hours; treating the resulting solid material with hydrocarbon diluent to extract a soluble portion of said material; and recovering a hydrocarbon solution of said soluble portion.

10. A process according to claim 7 in which said component (b) is prepared by reacting said sodium iodide and said titanium halide in a hydrocarbon and in the presence of aluminum chloride.

11. A catalyst composition formed by mixing material comprising (a) an organometal compound selected from the group consisting of compounds having the formula $R_nM$ and compounds having the formula $R_2AlH$, wherein R is selected from the group consisting of alkyl, cycloalkyl, aryl, and combinations of these radicals, M is selected from the group consisting of magnesium and aluminum, and $n$ is an integer equal to the valence of the metal M, and (b) the hydrocarbon-soluble reaction product of sodium iodide and a titanium halide having the formula $TiX_y$, wherein X is selected from the group consisting of chlorine and bromine, and $y$ is an integer from 2 to 4, inclusive, said reaction product having been formed by contacting sodium iodide and titanium halide with up to 0.5 mol of aluminum chloride per mol of sodium iodide and in the absence of the hydrocarbon diluent when no aluminum chloride is present, there being at least 0.05 mol of aluminum chloride per mol on sodium iodide when hydrocarbon diluent is present, and dissolving soluble portion of the total reaction product in hydrocarbon diluent selected from the group consisting of paraffins, cycloparaffins, aromatics and mixtures thereof having 3 to 12 carbon atoms per molecule, the mol ratio of said organometal compound to said titanium halide being in the range of 2:1 to 20:1 when said organometal compound is an organoaluminum compound and in the range of 0.75:1 to 3:1 when said organometal compound is an organomagnesium compound and the mol ratio of said sodium iodide to said titanium halide being in the range of 1:1 to 5:1, said hydrocarbon soluble reaction product being separated from any hydrocarbon insoluble reaction product prior to said mixing.

12. A catalyst composition according to claim 11 formed by mixing materials consisting essentially of triisobutylaluminum and the hydrocarbon-soluble reaction product of sodium iodide and titanium tetrachloride.

13. A catalyst composition according to claim 11 formed by mixing materials consisting essentially of diethylmagnesium and the hydrocarbon-soluble reaction product of sodium iodide and titanium trichloride.

14. A catalyst composition according to claim 11 formed by mixing materials consisting essentially of diphenylmagnesium and the hydrocarbon-soluble reaction product of sodium iodide and titanium tetrabromide.

15. A catalyst composition according to claim 11 formed by mixing materials consisting essentially of triethylaluminum and the hydrocarbon-soluble reaction product of sodium iodide and titanium tribromide.

16. A catalyst composition according to claim 11 formed by mixing materials consisting essentially of diisobutylaluminum hydride and the hydrocarbon-soluble reaction product of sodium iodide and titanium tetrachloride.

References Cited by the Examiner

UNITED STATES PATENTS

| | | | |
|---|---|---|---|
| 2,909,510 | 10/1959 | Thomas | 260—93.7 |
| 2,994,691 | 8/1961 | Gates | 260—94.93 |

FOREIGN PATENTS

| | | |
|---|---|---|
| 1,113,311 | 8/1961 | Germany. |
| 1,256,231 | 2/1961 | France. |

OTHER REFERENCES

Gippin: I & E Product Research and Development, vol. 1, No. 1, March 1962, pp. 32–39. Page 32 relied upon.

JOSEPH L. SCHOFER, *Primary Examiner.*

JAMES A. SEIDLECK, *Examiner.*

E. J. SMITH, *Assistant Examiner.*